United States Patent [19]

Bechtolsheim

[11] Patent Number: 4,937,734
[45] Date of Patent: Jun. 26, 1990

[54] HIGH SPEED BUS WITH VIRTUAL MEMORY DATA TRANSFER AND RERUN CYCLE CAPABILITY

[75] Inventor: Andreas Bechtolsheim, Stanford, Calif.

[73] Assignee: Sun Microsystems, Inc., Mountain View, Calif.

[21] Appl. No.: 387,599

[22] Filed: Jun. 28, 1989

Related U.S. Application Data

[62] Division of Ser. No. 313,250, Feb. 21, 1989.

[51] Int. Cl.⁵ .............................................. G06F 13/00
[52] U.S. Cl. .................................... 364/200; 364/240; 364/240.1; 364/240.3; 364/256.3
[58] Field of Search .................... 364/200, 300, 900

[56] References Cited

U.S. PATENT DOCUMENTS 4,378,591  3/1983  Lemay .................................. 364/200
4,803,621  2/1989  Kelly ................................... 364/200

Primary Examiner—Raulfe B. Zache
Attorney, Agent, or Firm—Blakely Sokoloff Taylor & Zafman

[57] ABSTRACT

A high speed data transfer bus with virtual memory capability. The bus has particular applications in computer systems which employ peripheral devices. The bus allows high speed data transfer through the use of a virtual memory scheme. This minimizes the number of lines required to implement the bus and minimizes the amount of time a particular device is required to wait before it can access the bus and complete a data transfer. Control signals are employed that are driven both active and inactive, facilitating interfacing the bus to low-power CMOS technology.

7 Claims, 6 Drawing Sheets

| 32 BIT ACKNOWLEDGE | 8 BIT ACKNOWLEDGE | ERROR | DEFINITION |
|---|---|---|---|
| 0 | 0 | 0 | WAIT |
| 0 | 0 | 1 | ERROR |
| 0 | 1 | 0 | 8-BIT PORT |
| 0 | 1 | 1 | RERUN |
| 1 | 0 | 0 | 32-BIT PORT |
| 1 | 0 | 1 | ERROR |
| 1 | 1 | 0 | 16-BIT PORT |
| 1 | 1 | 1 | RESERVED |

Fig. 5

| SIZE 1 | SIZE 2 | SIZE 3 | DATA TRANSFER SIZE |
|---|---|---|---|
| 0 | 0 | 0 | 4 BYTES |
| 0 | 0 | 1 | 1 BYTE |
| 0 | 1 | 0 | 2 BYTES |
| 0 | 1 | 1 | 3 BYTES |
| 1 | 0 | 0 | 16 BYTES |
| 1 | 0 | 1 | RESERVED |
| 1 | 1 | 0 | RESERVED |
| 1 | 1 | 1 | RESERVED |

Fig. 6

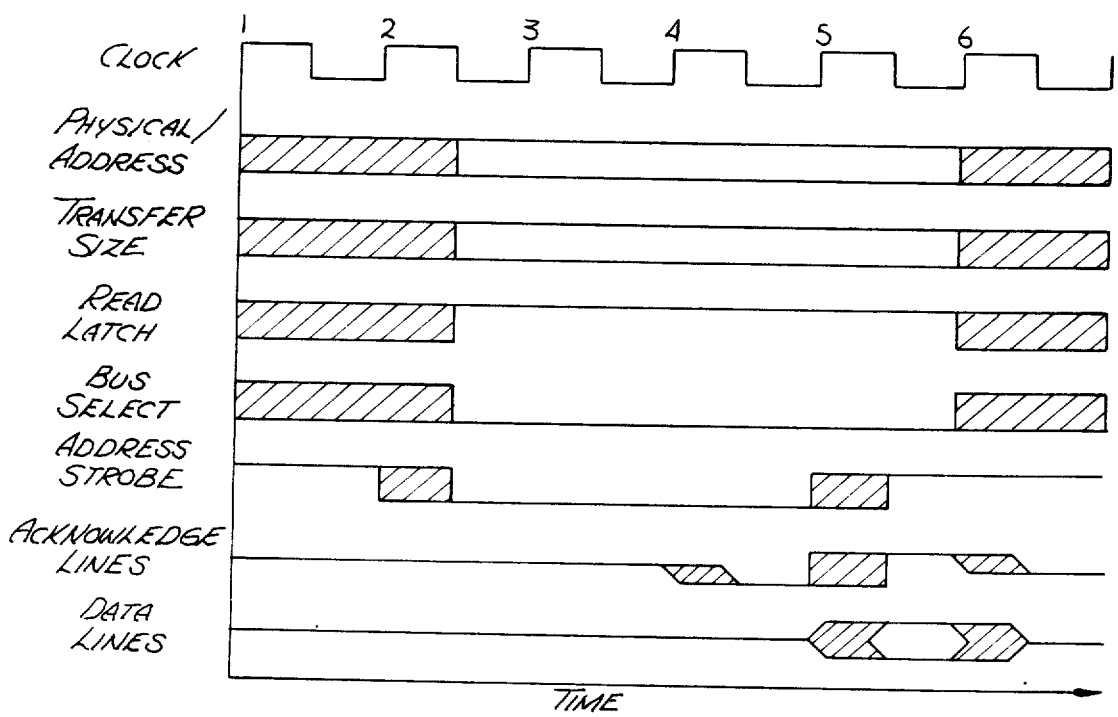
Fig. 7a — Read Cycle
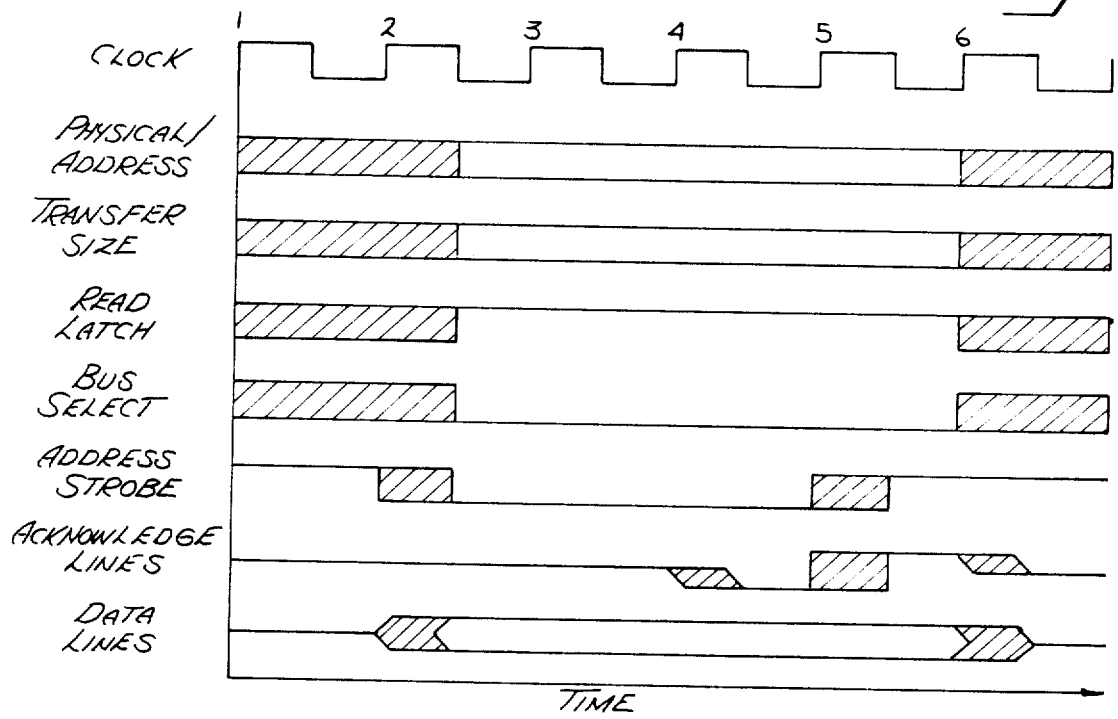
Fig. 7b — Write Cycle

HIGH SPEED BUS WITH VIRTUAL MEMORY DATA TRANSFER AND RERUN CYCLE CAPABILITY

This is a divisional of application Ser. No. 07/313,250, filed Feb. 21, 1989.

BACKGROUND OF THE INVENTION

1. Field of the Invention:

The present invention relates to a method and apparatus for transferring data among various components of a computer system. More particularly, the present invention relates to an improved computer bus with virtual memory capabilities.

2. Art Background:

In a typical computer system, a central processing unit (CPU) reads from, and writes data to, peripheral devices and other components which comprise the data processing system. This communication between devices is frequently accomplished by means of a bus which interconnects all of the components of the computer system. The speed at which the bus transfers data directly limits the overall speed of the computer system. Common constraints on the speed of data transfer between components coupled to the bus are protocol or "handshake" restrictions. These require a predetermined sequence of events to occur within specified time limits prior to an actual exchange of data between the devices coupled to the bus. It is therefore desirable to have a high speed and high bandwidth bus which operates quickly to minimize the computing time required for a particular task. The protocol utilized by the bus should be designed to be as efficient as possible and minimize the time required for data transfer.

In addition, many systems employ virtual memory schemes to increase the capability of the data processing system. As is well known, virtual memory techniques permit a CPU to address more memory then there is physically present in the computer system's main memory. When the CPU needs to read or write data in main memory, it generates a virtual address for the data. This virtual address is translated into a physical address by a memory management unit (MMU). The physical address is then applied to the main memory to read or write data at that address. Since the time required for the CPU to access main memory is typically much less than the access time for a peripheral device (such as an external disk drive), overall speed of program execution is increased.

The MMU accepts a virtual address generated by the CPU and translates it into a corresponding physical address located in main memory. If the translation data is not currently stored in the MMU, then the MMU transfers the proper translation data into its memory from main memory or another peripheral device. MMU's also provide capabilities such as multiple address spaces for separate processes, sharing of memory between processors, and the protection of desired memory locations by permitting only certain operations such as read, write, or execute to such areas. A variety of virtual memory systems are known in the field of computer systems, and are commonplace in state-of-the-art computing equipment. One such type of memory management unit is described in U.S. Pat. No. 4,550,368.

Another limitation on a computer bus is the size of the bus itself. Essentially, a bus is a collection of wires connecting the various components of a computer system. In addition to address lines and data lines, the bus will typically contain clock signal lines, power lines, and other control signal lines. As a general rule, the speed of the bus can be increased simply by adding more lines to the bus. This allows the bus to carry more data at a given time. However, as the number of lines increases, so does the cost of the bus. It is therefore desirable to have a bus which operates as quickly as possible while also maintaining a bus of economical size.

SUMMARY OF THE INVENTION

An improved high speed bus with virtual memory capability is disclosed. The bus has particular application in computer systems which employ peripheral devices. The bus allows high speed data transfer through the use of a virtual memory scheme. Moreover, the present invention minimizes the number of lines required to implement the bus. The present invention also minimizes the amount of time a particular device is required to wait before it can access the bus and complete a data transfer. The bus comprises a plurality of lines including address lines, data lines and various command or control lines. A variety of data processing units, referred to as agents, are coupled to the bus. A controller is provided which controls access to the bus by the agents. A memory management unit (MMU) and a virtual address latch (VAL) are coupled to the bus to implement the virtual address scheme of the present invention.

During operation of the bus, data is transferred between agents over the bus. A requesting agent asserts a virtual address over the data lines in the bus. This virtual address is converted into a physical address by the MMU. This physical address is applied to address lines in the bus. The requesting agent asserts a predetermined sequence of control signals, and the receiving agent which is storing the data asserts the requested data over the data lines. The present invention also employs a method of preventing deadlock conditions to occur during the operation of the bus. If a requesting agent supplies a virtual address to the MMU and the MMU does not have the necessary translation data to generate a physical address, then the MMU will issue a "rerun" signal. This signal allows the requesting agent to "back off" and temporarily suspend the pending data transfer process. The MMU can then gain control of the bus and fetch the proper translation data. After the MMU has obtained the necessary translation data, the data transfer process is resumed. Without the rerun signal the MMU would be unable to gain control of the bus. This could result in a deadlock condition where no data is transferred and the bus "freezes up." The present invention also incorporates a scheme whereby certain lines in the bus are tri-statable, and are always driven active and inactive (asserted and deasserted by active drive) before they are tri-stated. This is in contrast to prior bus structures wherein lines were deasserted passively by means of pull-up or pull-down resistors. The tri-stating scheme of the present invention reduces power consumption and allows the bus to be directly driven by CMOS devices.

BRIEF DESCRIPTION OF THE DRAWINGS

FIG. 5 is a chart showing, in tabular form, the possible encoded acknowledge responses of an accessed agent.

FIG. 6 is a chart showing in tabular form, the possible transfer line signals, and their meanings.

FIG. 7a is a timing diagram for a CPU read cycle for transferring data over the bus.

FIG. 7b is a timing diagram for a CPU write cycle for transferring data over the bus.

DETAILED DESCRIPTION OF THE INVENTION

An improved high speed bus is described having particular application for use in chip-level computer systems employing virtual memory techniques. In the following description for purposes of explanation specific memory sizes, bit arrangements, numbers, data transfer rates, etc. are set forth in order to provide a thorough understanding of the present invention. It will be apparent to one skilled in the art, however, that the present invention may be practiced without these specific details. In other instances, well known circuits and components are shown in block diagram form in order not to obscure the present invention unnecessarily.

Figure 1:
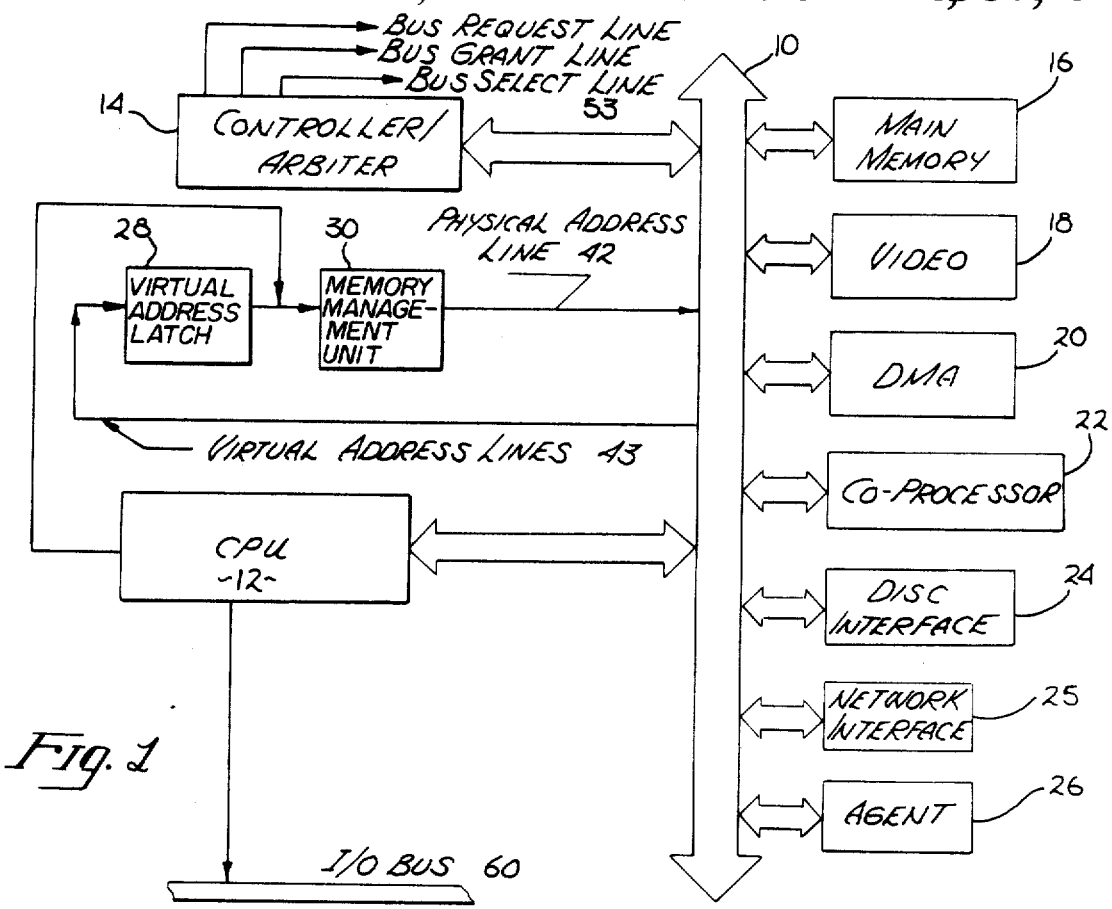
FIG. 1 is a schematic representation of a computer system employing the preferred embodiment of the present invention.

Referring first to FIG. 1, the major components of a computer system employing the present invention are shown. A central processing unit (CPU) 12 communicates with the elements of the computer system over bus 10. Bus 10 includes a plurality of individual lines which carry data and control signals to various components of the computer system. The system shown in FIG. 1 further includes a main memory 16, a video device 18, a Direct Memory Access (DMA) device 20, a coprocessor 22, a disk interface 24, and a network interface 25. Additional units such as accelerators or additional memory may be added to the system if desired. For the purposes of this Specification, all data processing and peripheral devices which are coupled to the bus 10 of the present invention are collectively referred to as "agents" and given the general reference numeral 26.

The present invention is intended to allow the various elements of the computer system to communicate with each other. It has been found that the present invention is particularly suited for communication among high performance chip level devices. It is often desirable, however, for the computer system to communicate with other systems. These systems may not utilize the same communication protocols used in the present bus system. Thus, the computer system may be provided with a separate input/output (I/O) bus 60. This I/O bus 60 may use any one of a number of communication schemes which are well-known in the art. Of course, it will be apparent to those skilled in the art that the present bus system can be used to communicate with external devices if those devices use or understand the timing protocols of the present invention.

The present invention also comprises a controller/arbiter 14 which is coupled to the bus 10. As will be described more fully below, the controller 14 performs various functions including controlling and allocating access to the bus 10 among the various agents. The controller does this by asserting a bus grant signal over the bus grant line 49. Each agent coupled to the bus has a unique bus request, bus select and bus grant lines coupled between the controller/arbiter 14 and the particular agent. When an agent requires control of the bus, it asserts a signal over its bus request line 49. The controller 14 receives all such requests, prioritizes and stores them, waits until the bus is idle and asserts a bus grant signal over the bus grant line 49 to one of the requesting devices. In the preferred embodiment, the controller uses a round robin priority arbitration scheme. It will be apparent to these skilled in the art, however, that different arbitration schemes can be used as a matter of design choice. For example, the controller 14 could assign bus grants on a first-requested, first-granted basis. Alternatively, each agent could be assigned a unique priority number and the controller 14 could assign bus grants to the requesting agent with the highest priority. The controller also prevents the occurrence of deadlock conditions which arise when two or more agents seek access to the bus 10 at the same time. This accomplished through the use of a "rerun" protocol which is described below.

As will be described, the present invention comprises a bus with a high speed parallel data transfer rate, low power consumption, and a minimum number of lines. Furthermore, the present invention minimizes the time required for a particular agent to gain access to the bus. Although FIG. 1 illustrates specific processor and peripheral units coupled to the bus 10, it will be apparent to those skilled in the art that the structure of the present invention permits a wide variety of processing units and peripheral devices to be interconnected in a variety of systems using the bus structure described herein.

The preferred embodiment of the bus is designed to be used with CMOS technology. As such, certain power specifications and timing protocols are optimized to reduce power consumption and work efficiently with CMOS devices. It will be apparent to those skilled in the art that those specifications may be changed without departing from the sprint of the present invention.

Throughout the following description, certain bus lines will be described as being "active high" or "active low." This terminology is used to indicate whether a particular bus signal in question is, or is not, asserted and relevant to the bus operation. It will be apparent, however, that it is a matter of design choice whether a given bus line is active high or active low. While the preferred embodiment has been designed to maximize data transfer speed and minimize power consumption, it will be appreciated that changing the design of the bus to change an active high line to active low is within the scope of the present invention.

Similarly, as described more fully below, the preferred embodiment of the bus is completely synchronous. All bus signals change on the rising edge of the clock pulses. The synchronous design is desirable because high data transfer rates require high clock speeds, and it is easier to detect clock pulse edges at high speeds. It will be appreciated that the use of the rising edge of the clock pulses is a matter of design choice and that the present invention could be made completely synchronous with the falling edges of the clock pulses instead.

Figure 2A:
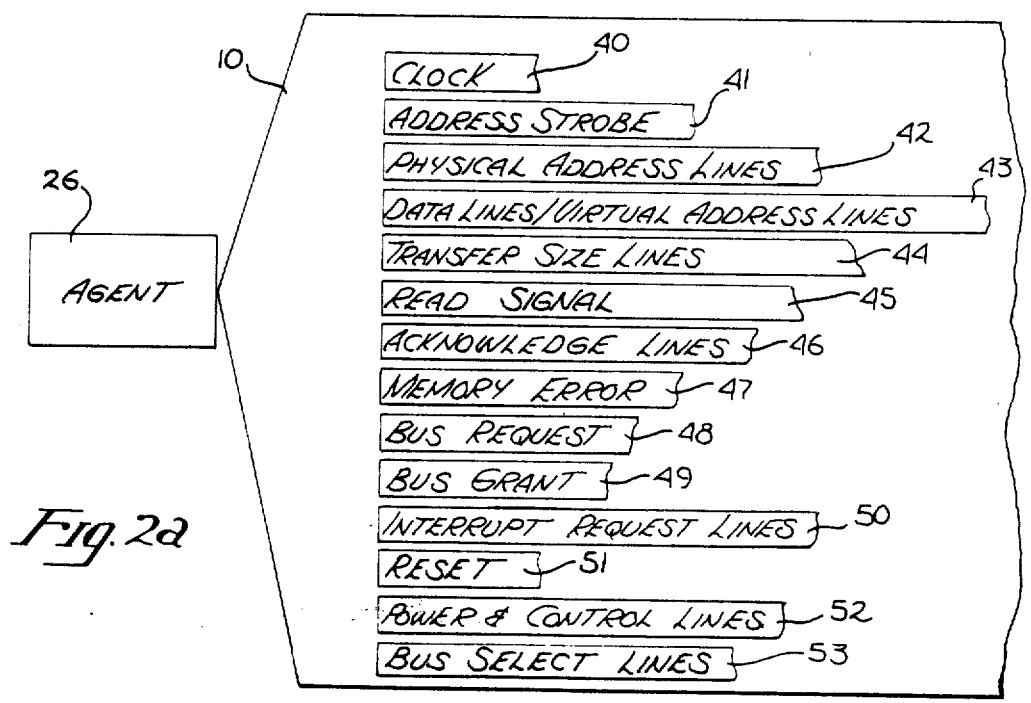
FIG. 2a diagrammatically illustrates the various sub bus structures comprising the high speed bus of the present invention.

Referring now to FIG. 2a, the preferred embodiment of the present invention comprises a bus 10 which includes ninety-six individual lines. As shown, the bus is connected to the various agents 26 which comprise the computer system illustrated in FIG. 1 (including main memory 16, video port 18 and disc drive 24). The bus 10 includes a clock line 40 which distributes a central clock signal among the agents 26. The bus 10 also includes physical address lines 42 and virtual address/data lines 43. In the preferred embodiment, there are twenty-eight physical address lines and thirty-two virtual address/data lines. However, a different number of such lines can be used depending on the size of the data to be transferred. An address strobe line 41 is provided which allows a receiving agent to strobe the address which is present on the physical address lines 42.

During the operation of the bus 10, various protocol signals are asserted at specific times in order to insure accurate data transfer among the agents 26. To this end, the present invention includes transfer size lines 44 which indicate the width (in bytes) of the data to be transferred, and acknowledge lines 46 which allow an agent accessed by the CPU 12 or other agent to acknowledge a request for data. As will be described, the accessed agent provides these responses in an encoded format. Memory error line 47 is asserted if an agent from whom data is requested detects an error during transfer.

The bus 10 also contains lines for the control of the bus, so that only one agent 27 will drive the bus at any given time. As previously described, the bus request line 48 and bus grant line 49 are unique to each agent. There are also interrupt request lines 50 which allow an agent to interrupt the bus operation. This may be necessary if an agent needs to complete a high priority task and is unable to obtain normal access to the bus because of an ongoing data transfer. In the preferred embodiment, there are seven interrupt request lines. It will be apparent to those skilled in the art, however, that a larger or smaller number of such lines may exist without departing from the scope of the present invention. For example, if it is expected that agents will interrupt the bus only infrequently, there can be a single interrupt request line which is shared by all of the agents. Bus reset line 51 is provided which is used to reset the bus. Reset may be necessary during initial power-up or if an error condition occurs. Finally, power lines 52 supply the voltage and current necessary to operate the bus.

Most of the lines which make up the bus are digital lines which can be driven to either a high level (1) or a low level (0). However, the preferred embodiment also contains control lines driven following a special protocol. In many prior art systems, digital lines may be asserted by being driven active low. When the line is to be de-asserted, the agent ceases driving the line low and pull-up resistors return the line to its normally high state. The speed which the line is returned to its inactive (high) state is a function of the capacitance of the line and the value of the pull-up resistance.

Figure 3:
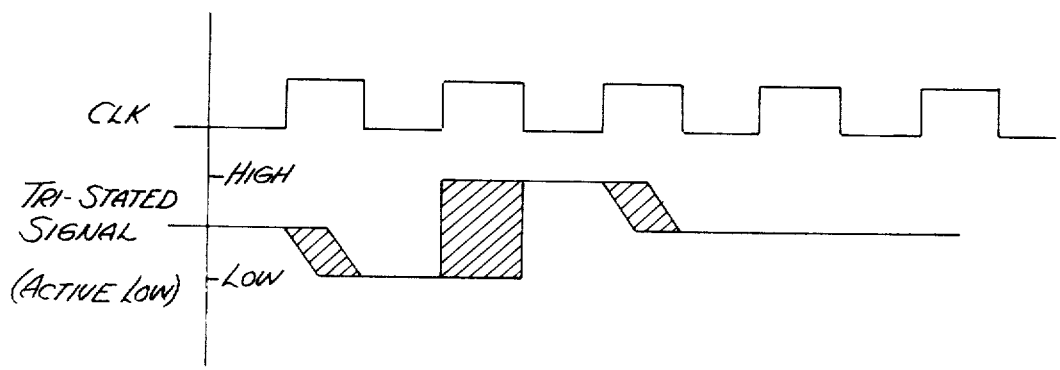
FIG. 3 is a timing diagram showing the timing protocols for the tri-stated control signals used in the present invention.

As shown in FIG. 3, whenever a tri-statable signal is asserted, the driver for that signal first pulls the signal low (asserted). After asserting the signal, the driver will drive the signal high (inactive) before turning off. The tri-statable control signals have passive pull-up resistors which maintain the signals to the inactive level after the drivers turn off. Because of the low power DC specifications of CMOS devices it is not possible to provide active pull-up resistors which change the signals from the active to inactive levels within a short time period. Therefore, the protocol adopted in the present invention is used. The resistors on the tri-statable lines do not change the state of the signal from active to inactive. They merely maintain the signal at its inactive level. By driving the tri-statable signals, both low and then high, the problem of "floating" signals which is present in many prior art bus systems is avoided.

Figure 4:
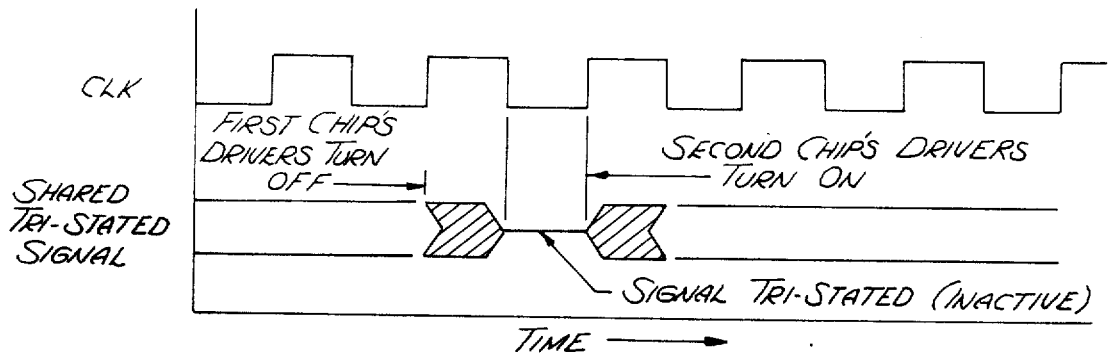
FIG. 4 is a timing diagram showing the driver protocol for tri-stated non-control signal lines used in the present invention.

Another feature of the present invention is the fact that no single line is driven by two agents during the same clock cycle. This avoids the problem of driver overlap between multiple drivers. The timing protocol for this feature is shown in FIG. 4. At the rising edge of the first clock cycle, the driver for the agent which is driving a particular line turns off. If the line is a tri-statable line it will be maintained to its tri-stated level by its passive resistor. The line will be at its tri-stated level by the end of the first clock cycle. When the rising edge of the second clock cycle is detected, the driver of the second agent will turn on and drive the line to the desired level.

The operation of the bus will now be described with reference to FIG. 1 and FIGS. 5 through 10. There are numerous tasks that can be accomplished with the use of the bus 10. While every such task cannot be covered in detail, the general operation of the bus can be described with reference to several examples. It is to be understood, therefore, that the following examples are given for illustrative purposes only, and are not intended to limit in any way the types of operations that may be performed by the bus 10.

Assume, for example, that the CPU 12 is required to read data stored in main memory 16. A timing diagram for this process is illustrated in FIG. 7a. The CPU 12 generates a virtual address corresponding to the data to be read. As shown in FIG. 1, this virtual address is transmitted directly to the MMU 30. The MMU 30 translates the virtual address to a physical address by means of any one of a number of methods known in the art, and transmits the physical address to the bus 10 over the physical address lines 42. As shown in FIG. 7a, at the same time the physical address is driven over the physical address lines 42 the CPU 12 also asserts the transfer size lines 44 to their proper levels.

The transfer size lines 44 provide an encoded signal to the memory 16 of the width (in bytes) of the data to be transferred over the bus 10. In the preferred embodiment there are three transfer size lines. FIG. 6 shows the various possible combinations of how the transfer size lines can be driven and their corresponding meaning as to the width of the data transfer. In the preferred embodiment, the bus 10 can accommodate data transfers of 1,2,3,4 or 16 bytes. It will be apparent to those skilled in the art, however, that different encoding schemes and corresponding data transfer sizes can be accomplished as a matter of design choice. The data lines 43 of the present invention are 32 bits wide. Therefore, the bus 10 can transfer up to 4 bytes of data simultaneously. As will be described fully below, if a 16 byte transfer is indicated by the transfer size lines, then the bus 10 executes multiple four-byte transfers.

Figure 2B:
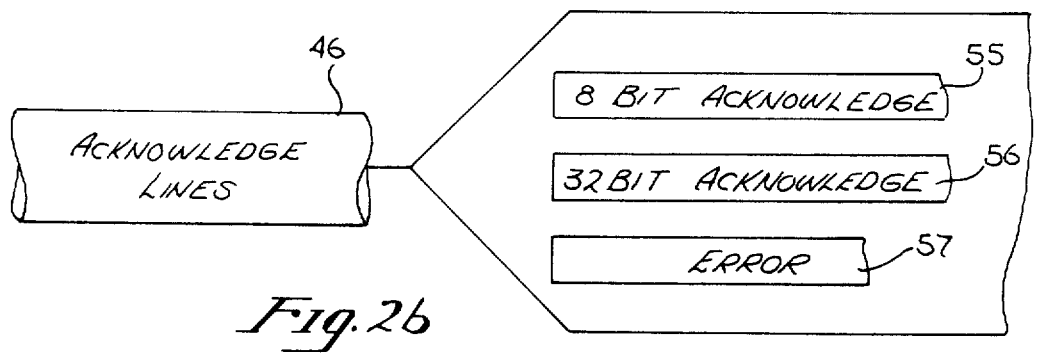
FIG. 2b illustrates the structure of the acknowledge lines in the present invention.

The controller 14 asserts the bus select line 53. When the controller 14 asserts the address strobe line 41, the memory 16 recognizes that is being accessed and responds with an acknowledge (ACK) signal over the acknowledge lines 46. As shown in FIG. 2b, the acknowledge lines 46 are made up of three separate lines: 8-bit acknowledge 55, 32-bit acknowledge 56, and error 57.

An accessed agent (in the present example, memory 16) has four choices of response. It can instruct the CPU 12 (or other accessing agent) to wait, issue a "rerun" response (which is described below), terminate the cycle if an error condition exists, or acknowledge the data transfer while simultaneously indicating the accressed agent's port size. FIG. 5 is a table of the encoded responses used in the preferred embodiment. As shown, the bus 10 can accommodate agents having port sizes of 8, 16, and 32 bits, (1, 2, and 4 bytes). It will be apparent to those skilled in the art that a different encoding scheme can be used as a matter of design choice. Moreover, it is within the scope of the present invention to allow for the use of devices having different port sizes—for example 4 bits of 64 bits. In the preferred embodiment, the acknowledge lines are active low.

After asserting the acknowledge lines 46, the memory 16 drives them high in the next clock cycle before tristating them as described previously with reference to FIG. 3. Upon receipt of the acknowledge signal, the controller 14 de-asserts the address strobe 41 (which is an active low signal). One clock cycle after asserting the acknowledge lines 46, the memory 16 drives the data lines 43 with valid data, and maintains the data valid for one full clock cycle on the data lines 45. After the data lines 43 are asserted, the memory 16 tri-states them, ending the read cycle.

Assume, for sake of example, that the CPU 12 is writing data to memory 16. The timing diagram for this process is shown in FIG. 7b. The CPU 12 asserts the physical address lines 42, transfer size lines 44, and applies data to the data lines 43. The controller 14 asserts the bus select line 53 and address strobe 54 on the same clock pulse. Substantially concurrently, the CPU 14 drives the data lines with the data to be written into memory 16. When the address strobe 41, and bus select lines 53, are valid on the rising edge of the same clock cycle, the memory 16 responds with an acknowledge signal as described above. Upon receiving a valid acknowledge signal, the controller de-asserts the address strobe 41, and the CPU 12 de-asserts the data lines 44. As shown in FIG. 1, the CPU 12 is coupled directly to the MMU 30. Accordingly, in the present embodiment, CPU 12 provides virtual addresses directly to the MMU, thereby by-passing the virtual address latch 28 and bus 10. However, it will be noted that CPU 12 may be directly coupled to bus 10, just as any other agent 26, such that its virtual addresses are applied to the data lines 43 as in the example described below with reference to DMA device 20.

Figure 8A:
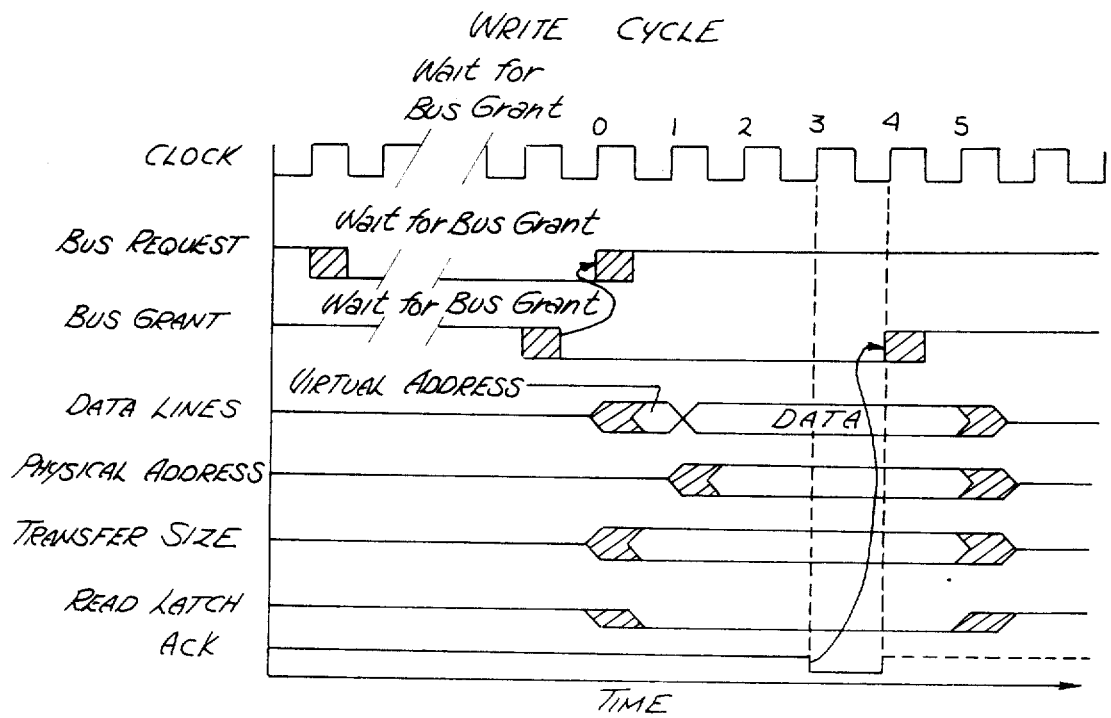
FIG. 8a is a timing diagram for a DMA device write cycle for transferring data over the bus.

FIG. 8a illustrates a timing diagram for a DMA device writing data directly to memory. As shown, the DMA device requests access to the bus by asserting the bus request line 48. As previously discussed, presently request line 48 is an active low line. The controller waits until the bus is inactive, and issues a bus grant signal to the requesting agent according to the arbitration scheme described above. On the immediately following clock cycle, the DMA device de-asserts the bus request and drives a virtual address onto the data lines 43. At the same time, the DMA device indicates the transfer size, as discussed above in relation to FIG. 6 and asserts the read line.

By driving the virtual address onto the data lines the present invention achieves several advantages over the prior art. First, of all of the agents connected to the bus are able to access memory through the MMU. This technique eliminates the need for a separate set of virtual address lines in the bus. As such, the total number of lines in the bus decreases, reducing complexity and manufacturing costs.

As shown in FIG. 1, the data/virtual address lines 43 are coupled to the virtual address latch 28. During the first clock cycle after a bus master (for example, CPU 12) receives a bus grant, the master applies the virtual address to the data lines 43. The virtual address latch 28 stores the virtual address value. This virtual address is then transferred into the MMU 30 which converts it to a physical address corresponding to a real address in main memory 18. As shown in FIG. 8a the physical address is asserted on the physical address lines by the MMU 30 after it is translated. Substantially concurrently with the physical address being asserted by the MMU 30, the controller 14 asserts bus select 53 and address strobe 41. In response to a simultaneously valid address strobe 41, bus select 53, and physical address 42, the slave device restores the write cycle and completes it by asserting ACK 46. Once the slave asserts ACK 46, the controller 14 will de-assert the bus grant signal after the cycle completes. When the bus grant signal is de-asserted, the master device no longer has control of the bus, and stops driving all signals after the next cycle, thus ending the write cycle.

Figure 8B:
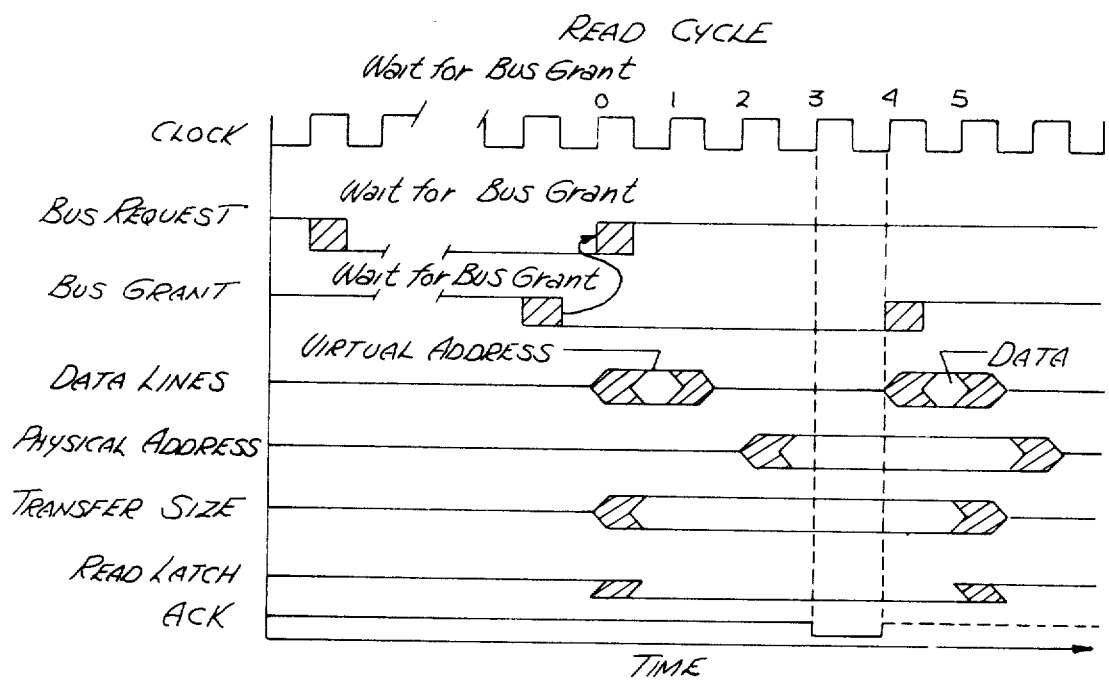
FIG. 8b is a timing diagram for a DMA device read cycle for transferring data over the bus.

FIG. 8b shows a timing diagram for a DMA device read from memory. As illustrated, the DMA device 20 asserts a bus request signal on the bus request line 48. When the bus is inactive, the controller 14 issues a bus grant signal in accordance with the arbitration scheme described above. Subsequently, the DMA device 20 de-asserts the bus request line 48, and applies to the data lines 43 the virtual address of the memory location to which the data is to be written. At the same time, the DMA device asserts the transfer size lines 44, and drives the read line 45 high. After the virtual address is driven onto the data lines, the DMA device 20 tri-states the data lines as discussed above with reference to FIG. 3. The MMU 30 translates the virtual address into a physical address, and applies this physical address to the physical address lines 42. When the physical address lines are asserted, the controller 14 asserts address strobe 41 and bus select 53. In response the memory 16 responds with a valid ACK signal over the acknowledge lines 46. After a valid ACK signal is asserted, the DMA device 20 drives the data to be written onto the data lines 43. Simultaneously, the controller 14 de-asserts the bus grant line 49. On the next clock cycle the DMA device tri-states the data lines, the transfer size lines, and the read latch, thus completing the DMA read cycle.

Figure 9:
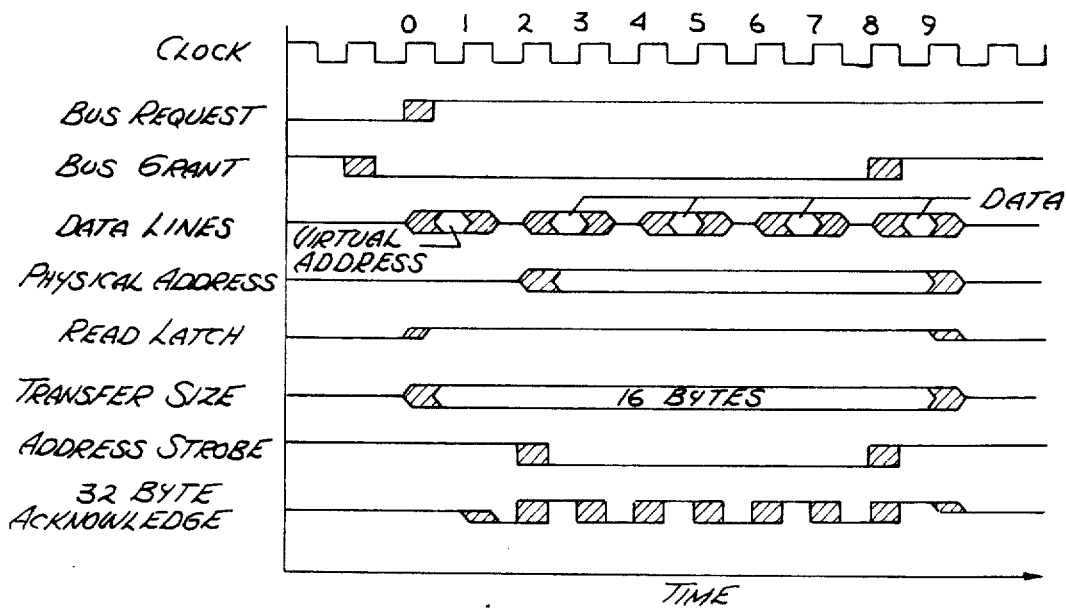
FIG. 9 is a timing diagram for a burst write cycle to memory.

The present invention can accommodate a high-bandwidth burst transfer mode wherein multiple bytes are written to or read from memory 16 by the CPU 12 or other agent 26. A timing diagram for one such CPU read operation is shown in FIG. 9. The agent 26 which is transferring data into memory requests control of the bus 10 by asserting a bus request signal over the bus request line 48. When the bus 10 is inactive, the controller 14 issues a bus grant signal in accordance with the arbitration procedures of the present invention as described previously. Once the bus grant is issued, the agent 26 which issued the bus request signal becomes a Bus Master and has control over the operation of the bus 10. On the clock cycle immediately following the bus grant, the Bus Master de-asserts the bus request line 48, and drives the read signal line 45 high. Substantially concurrently, a virtual address is driven onto the data lines 43 by the Bus Master. The Bus Master indicates that the transfer will consist of 16 bytes by asserting the transfer size lines 44 in accordance with the encoding scheme given in FIG. 6 above.

The virtual address is converted into a physical address by the MMU 30 and driven onto the physical address lines 42. At this point the memory must respond with a valid signal on the 32-bit acknowledge line 46 (active low). Upon receipt of a valid acknowledge signal, the Bus Master drives the first 4 bytes onto the data lines 43 to be written into memory 16. The memory 16 responds by driving the 32-bit acknowledge line 56 high and then low. The memory 16 also automatically increments the address into which the next group of four bytes will be transferred. After the 32-bit acknowledge line 46 is driven low, the Bus Master will latch a new group of four data bytes onto the data lines 43 to be written into or read from the new memory address. This process is repeated for each group of four bytes. After four groups of data have been transferred, the controller 14 de-asserts the bus grant line 49. The Bus Master then de-asserts the address strobe 41 and tri-states the read line 45 and transfer size lines 44. The memory tri-states the 32-bit acknowledge line 46, thereby ending the write cycle.

The present invention further implements a "rerun" protocol during which any pending cycle may be aborted and started later. This allows resolution of deadlocks between the CPU and DMA devices and allows agents to have a long read latency without locking out other bus requests.

Figure 10:
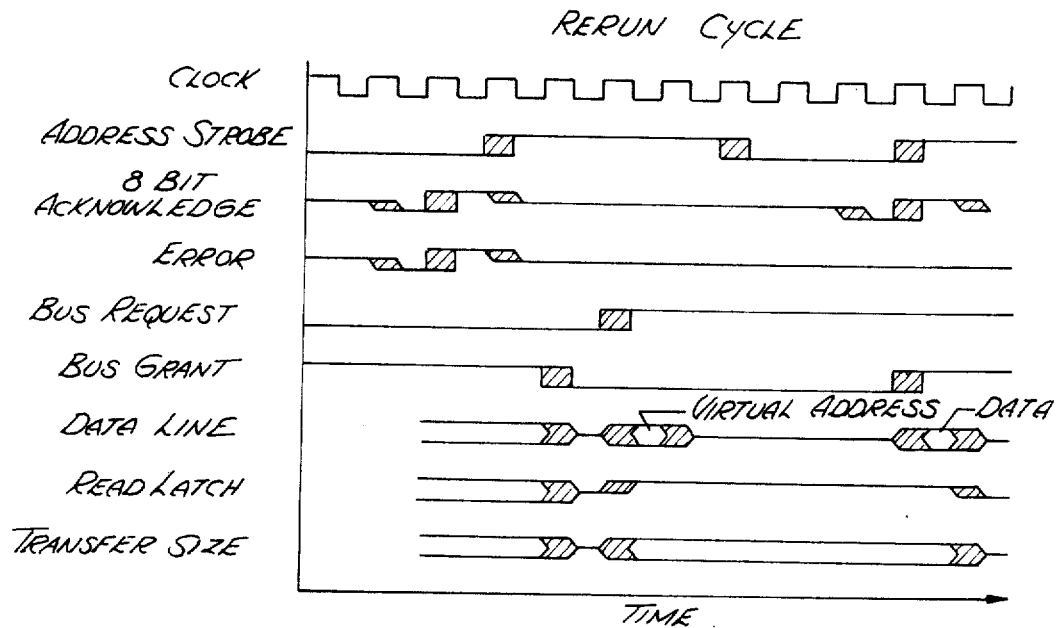
FIG. 10 is a timing diagram for a rerun cycle as used in the present invention.

Deadlocks can occur when an agent is capable of being both a slave agent and a Bus Master and cannot complete a slave access at a given time. The agent 26 must detect this condition and assert a rerun acknowledge by driving the 8-bit acknowledge line 46 and the error line 47 as shown in FIG. 5. The controller 14 will respond by terminating the cycle by negating the bus select line 53 and repeating the cycle at a later time. Prior to the repeat of the cycle, other bus masters may utilize bus 10. An example of a rerun cycle is shown in FIG. 10.

The rerun protocol is useful for several reasons. First, it allows agents other than the CPU 12 to access main memory 16 through the MMU 30. Assume that an agent transmits a virtual address to the MMU 30 through the VAL 28. If the corresponding physical address is not currently stored in the MMU 30, translation data for the MMU issues a rerun signal as described above. The requesting agent will then "back off" allowing the MMU 30 to fetch the proper translation data. The MMU 30 executes this transfer over the bus 10. The requesting agent can then retry its operation with the necessary data in the MMU 30 to permit translation of the virtual address into a physical address. Without the rerun protocol, the MMU would be unable to translate the virtual address into a physical address. The MMU 30 would be unable to gain control of the bus. This could lead to a deadlock condition, where the bus 10 would "freeze" the system, preventing data transfer.

The rerun feature also minimizes the amount of the time that a particular agent will be required to wait until it gains access to the bus. This waiting period is known as bus latency time. Bus latency occurs when a particular agent accesses a slave with a long access time, locking out all other agents. This can happen when an accessed agent requires a long period of time to supply requested data to the bus.

Any agent with a bus latency time greater than a predetermined period ot time (N) must respond before the time out with a rerun acknowledge. If the accessed agent takes longer than N cycles to respond, then the current (read or write) cycle is aborted and any pending bus request is serviced. After the pending request is serviced, the original cycle is restarted. During the rerun period, the accessed agent latches any asserted address and data lines, as these signals are not valid after the rerun cycle has been suspended.

Accordingly, a high speed bus with virtual memory capability, has been described. In the foregoing specification, the invention has been described with reference to specific exemplary embodiments thereof. It will, however, be evident that various modifications and charges may be made without departing from the broader spirit and scope of the invention as set forth in the appealed claims. The specification and claims are, therefore, to be regarded in an illustrative rather than a restrictive sense.

I claim:

1. In a computer bus having agents selectively coupled to a bus, an improved method of transferring data among such agents comprising the steps of:
   transmitting a virtual address from an accessing agent to a memory management unit (MMU) coupled to said bus, said memory management unit including storage means for storing translation data for translating said virtual address into a real address;
   transmitting a rerun signal from said MMU to said accessing agent if said MMU does not have translation data for said virtual address stored in said storage means;
   granting control of said bus to said MMU;
   transferring the translation data for said virtual address from an external peripheral device to said MMU;
   retransmitting said virtual address to said MMU from said accessing agent;
   translating said virtual address into a physical address;
   transferring said data between said accessing agent to a memory location corresponding to said physical address.

2. The method of claim 1, wherein said bus comprises a plurality of lines, including data lines and address lines coupled to each of said agents.

3. The method of claim 1, wherein said virtual address is transmitted to said MMU over said data lines, and said physical address is asserted on said address lines by said MMU.

4. The method of claim 3, wherein said bus further includes a clock signal line coupled to each of said agents and to a bus clock, and wherein all signals on said lines of said bus change synchronously with a rising edge of a clock signal provided by said bus clock on said clock signal line.

5. The method of claim 4, wherein said accessing agent transmits a re-run acknowledge signal to said MMU upon receipt of said re-run signal.

6. The method of claim 5 further including the step of terminating a data transfer cycle if said cycle exceeds a predetermined number (N) of said clock signals provided by said bus clock on said clock signal line and another one of said agents has asserted a pending bus request signal to access said bus.

7. The method of claim 6 further including the step of restarting said terminated data transfer cycle and completing said restarted cycle once said current cycle has been completed.

* * * * *

UNITED STATES PATENT AND TRADEMARK OFFICE
CERTIFICATE OF CORRECTION

PATENT NO. : 4,937,734
DATED : 6/26/90
INVENTOR(S) : Bechtolsheim

It is certified that error in the above-identified patent and that said Letters Patent is hereby corrected as shown below:

| | | |
|---|---|---|
| col. 03, line 65 | after "chip" | insert -- - -- |
| col. 07, line 25 | delete "of" | insert --or-- |
| col. 08, line 8 | delete "of" | (first occurrence) |
| col. 10, line 12 | delete "ot" | insert --of-- |

Signed and Sealed this

Fifteenth Day of December, 1992

Attest:

DOUGLAS B. COMER

*Attesting Officer*   *Acting Commissioner of Patents and Trademarks*